United States Patent
Kodaka et al.

[11] Patent Number: 5,900,992
[45] Date of Patent: May 4, 1999

[54] COLLAPSIBLE LENS BARREL

[75] Inventors: Yoshiro Kodaka, Kawasaki; Tsuneo Watanabe, Tokyo, both of Japan

[73] Assignee: Nikon Corporation, Tokyo, Japan

[21] Appl. No.: 08/971,568

[22] Filed: Nov. 17, 1997

Related U.S. Application Data

[63] Continuation of application No. 08/635,660, Apr. 22, 1996, abandoned.

[30]     Foreign Application Priority Data

Jul. 27, 1995  [JP]  Japan ................................. 7-191481

[51] Int. Cl.$^6$ ........................... G02B 15/14; G02B 15/22; G02B 7/02
[52] U.S. Cl. ...................... 359/702; 359/704; 359/705; 359/823; 359/826
[58] Field of Search ................................. 359/702, 704, 359/705, 823, 826

[56]         References Cited

U.S. PATENT DOCUMENTS 4,557,576  12/1985  Drefchinski ........................ 354/295
5,181,144   1/1993  Shirie et al. ......................... 359/702

*Primary Examiner*—Georgia Epps
*Assistant Examiner*—Evelyn A. Lester

[57]          ABSTRACT

A lens barrel capable of shortening its full length includes a photo-taking optical system with a rear unit lens and a front unit lens, a rear unit lens holding cylinder holding the rear unit lens, a front unit lens holding cylinder holding the front unit lens and movable in the direction of an optical axis relative to the rear unit lens between a photographing position for making the photo-taking optical system capable of photographing with the rear unit lens and a full length shortening position for shortening the full length of the lens barrel in the direction of the optical axis and a fixing member for fixing the front unit lens holding cylinder in one of the aforementioned positions relative to the rear unit lens holding cylinder.

9 Claims, 4 Drawing Sheets

COLLAPSIBLE LENS BARREL

This application is a continuation of application Ser. No. 08/635,660, filed Apr. 22, 1996, now abandoned.

BACKGROUND OF THE INVENTION

1. Field of the Invention

This invention relates to a collapsible lens barrel suitable for use in a camera.

2. Related Background Art

Heretofore, a lens barrel of this kind has had its full length in the direction of its optical axis shortened (hereinafter referred to as "collapsing") during non-photographing to thereby improve the portability of the lens barrel. Generally, there are two kinds of methods of effecting the collapsing of a lens barrel.

A first method is a method of separating a lens barrel into a mounting portion for a camera body and a barrel portion. The barrel portion is mounted on the camera body in the mounting portion, and the barrel portion is slidable in the direction of the optical axis relative to the mounting portion. During photographing the barrel portion is disposed so as to protrude forwardly of the lens (forwardly of the optical axis), and during non-photographing the barrel portion is retracted to the interior of the camera body, whereby collapse is effected.

A second method is a method used in a zoom lens barrel or the like, and the operation range of an operating ring for driving a zoom lens unit is extended rearwardly of the optical axis. When collapsing is to be effected in this method, the zoom lens unit is moved rearwardly of the optical axis usually beyond a photographing range to thereby shorten the full length of the lens barrel.

However, lens barrels using the above-described conventional collapsing methods have suffered from the following problems.

In a lens barrel using the first collapsing method, if it is a lens barrel equipped with only a function independent on a camera body such as manual focusing or a preset aperture, it is relatively easy to effect its design and manufacture. However, in the case of a lens barrel equipped with the auto focusing function and an automatic aperture mechanism which are now more popular, the presence of an aperture transmitting member and an auto focus drive force transmitting mechanism connected to the camera body side prevents the lens barrel from being simply separated into a mounting portion and a barrel portion. This has led to the problem that the design and manufacture of the lens barrel are difficult.

Also, there are a mirror and others in the camera body and the lifting or the like of the mirror is effected in advance by a discrete mechanism provided on the camera body side, whereafter it is required to retract the barrel portion into the camera body. However, if in the case of lens interchange, the mirror lifting operation is not effected from carelessness, the barrel portion in its collapsed state will strike against the mirror or the internal mechanism of the body and lens interchange will not be effected smoothly. If in contrast, design is made such that the lifting of the mirror takes place automatically during lens interchange, it has led to the problem that the mechanism on the camera body side will become very complicated.

On the other hand, in the case of a lens barrel using the second collapsing method, it is possible to effect collapse only within a range in which a zooming lens unit or the like can be rearwardly retracted. Accordingly, this has led to the problem that in a lens barrel wherein a fixed lens unit is arranged long in the direction of the optical axis, there is a limit to the shortening of the full length of the lens barrel by collapsing.

SUMMARY OF THE INVENTION

It is an object of the present invention to solve the above-noted problems and to provide a collapsible lens barrel which requires no operation corresponding to the collapsing movement of the lens barrel on a camera body side.

It is another object of the present invention to provide a collapsible lens barrel which enables a connecting mechanism for a front unit lens holding cylinder and a rear unit lens holding cylinder to be simple and inexpensive.

It is still another object of the present invention to provide a collapsible lens barrel which, when not in a state in which photographing is possible, can transmit to a camera body side electrical information for preventing a photographing operation from being executed.

It is yet still another object of the present invention to provide a collapsible lens barrel which, when not in a state in which photographing is possible even if it is mounted on a camera body performing a mechanical type photographing operation, prevents the photographing operation from being executed.

DESCRIPTION OF THE PREFERRED EMBODIMENTS

The present invention will hereinafter be described in greater detail with respect to some embodiments thereof with reference to the drawings.

(First Embodiment)

Figure 1:
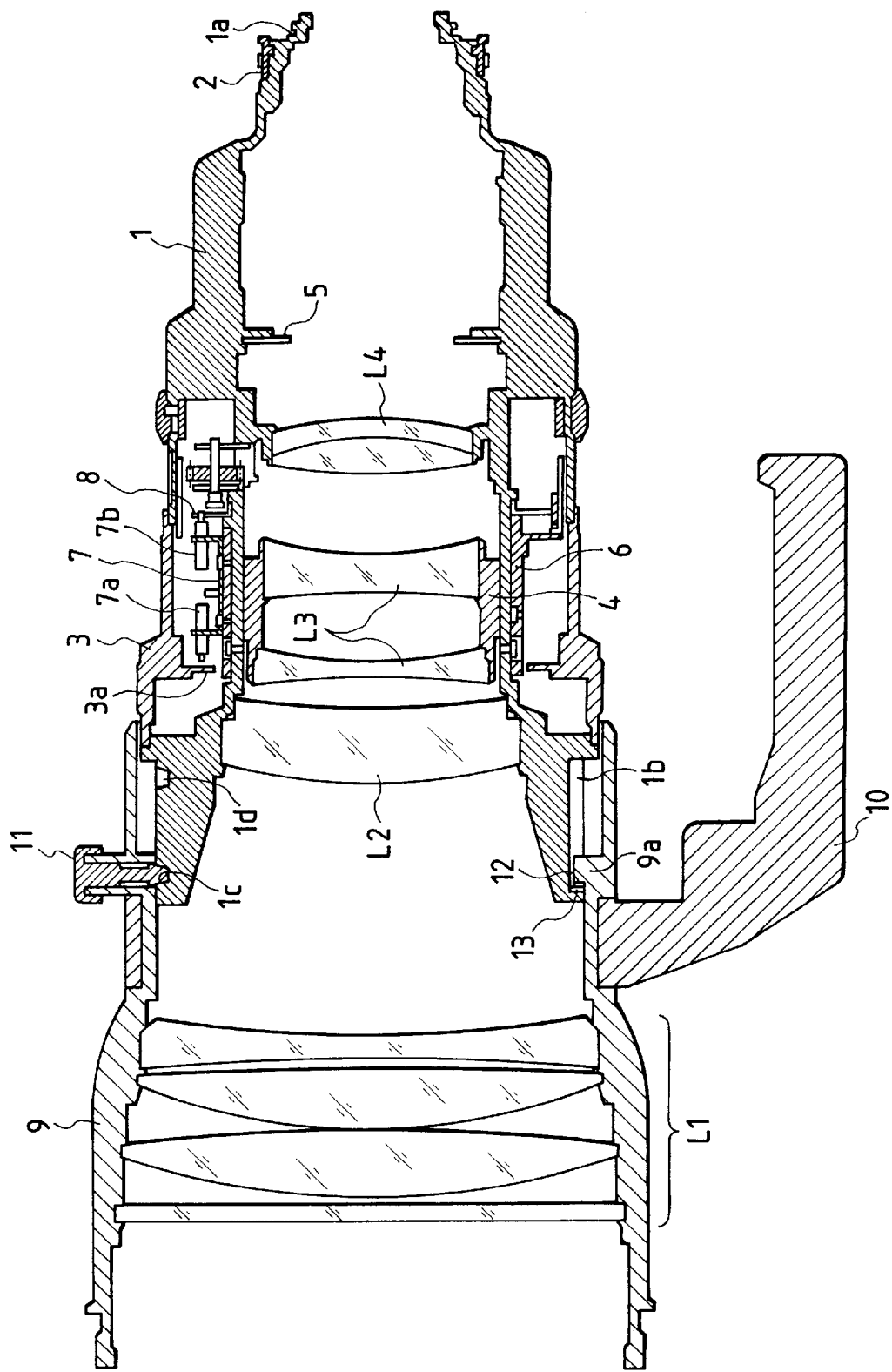
FIG. 1 shows a cross-section when a lens barrel which is a first embodiment of the present invention is in a photographing state.
Figure 2:
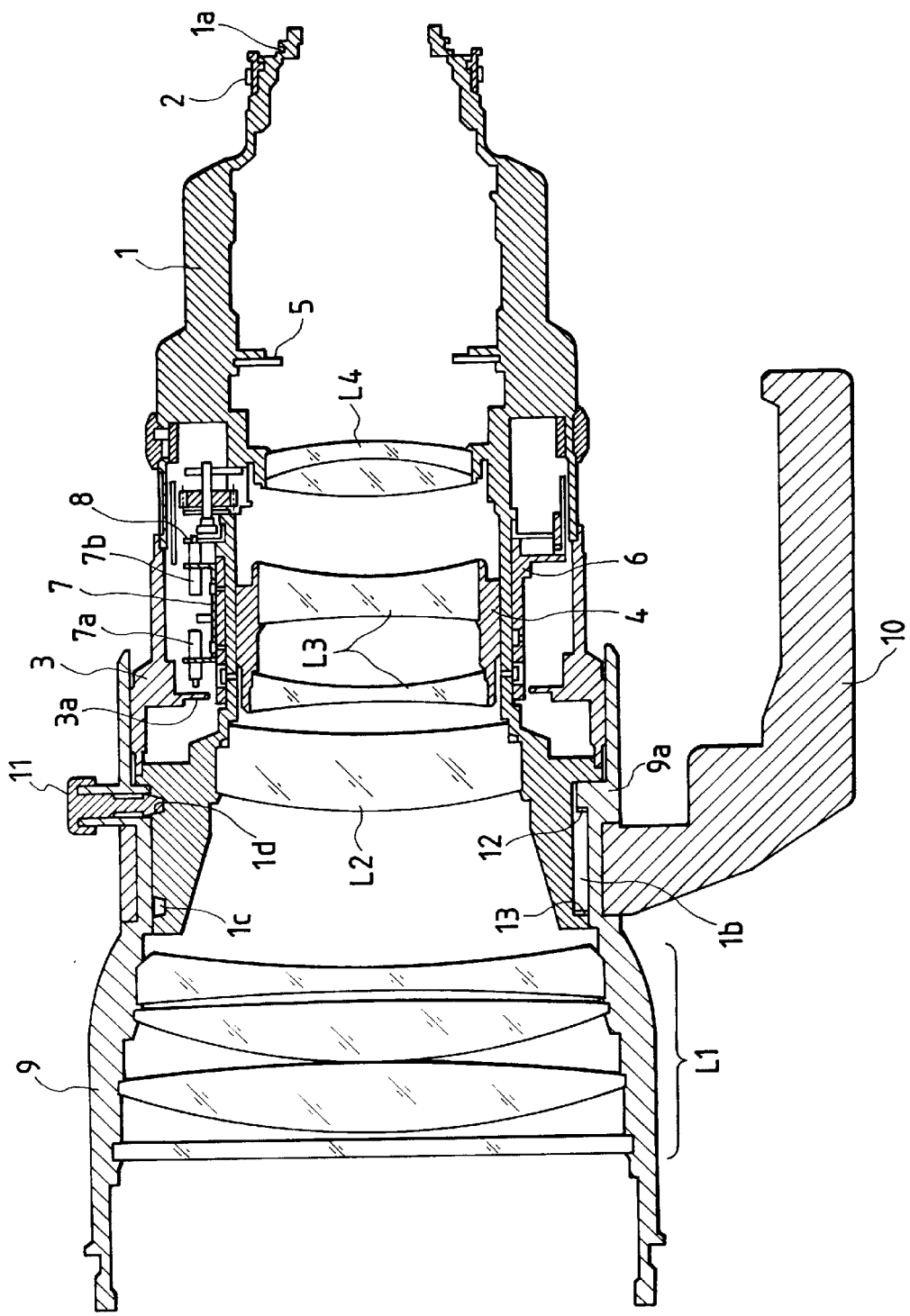
FIG. 2 shows a cross-section when the lens barrel which is the first embodiment of the present invention is in a collapsed state.

FIGS. 1 and 2 show a cross-section of a lens barrel which is a first embodiment of the present invention. This embodiment shows a super-telephoto lens and is characterized in that the distance in the direction of an optical axis between lens units L1 and L2 is made long to increase magnification. The construction of the present embodiment will hereinafter be described with reference to FIG. 1.

A rear unit lens holding cylinder 1 is a fixed cylinder holding a fixed lens unit L2 on the inner peripheral side thereof. The rear unit lens holding cylinder 1 is provided with a mounting portion 1a in the rear end portion thereof, and is mounted on a camera body, not shown, through the mounting portion 1a.

An aperture preset ring 2 is an annular member installed for rotation about the optical axis on the outer peripheral surface of the rear unit lens holding cylinder 1 in the portion thereof somewhat forward of the rear end thereof in the optical axis direction. An aperture unit 5 installed on the inner peripheral side of the rear unit lens holding cylinder 1 is a mechanism including a plurality of annularly arranged aperture blades and an aperture driving plate for driving those aperture blades, and for adjusting the quantity of light travelling toward the camera body.

The aperture unit 5 is connected to the aperture preset ring 2 by a power transmitting mechanism, not shown. When the aperture preset ring 2 is manually rotatively operated, the rotational movement thereof is transmitted to the aperture driving plate of the aperture unit 5, whereby the aperture driving plate is rotated. The rotational movement of the aperture driving plate in turn is transmitted to the aperture blades, whereby the respective aperture blades are moved in a plane perpendicular to the optical axis to thereby vary the opening diameter of a ring formed by them.

The aperture unit 5 is also connected to a stop-down member (not shown) provided in the mounting portion 1a. The stop-down member is connected to an aperture driving member on the camera body side when the present lens barrel is mounted on the camera body, whereby the automatic aperture adjustment of the present lens barrel becomes possible from the camera body side.

The fixed lens unit L2 and a fixed lens unit L4 are lens units which are not moved back and forth in the direction of the optical axis. The fixed lens units L2 and L4 are installed on the inner peripheral surface of the rear unit lens holding cylinder 1 in the fore portion of the rear unit lens holding cylinder 1 and rearwardly of the fixed lens unit L2, respectively.

A lens unit 13 for focus adjustment is moved back and forth in the direction of the optical axis between the fixed lens unit L2 and the fixed lens unit L4 to thereby adjust the in-focus state of the optical system of the present lens barrel. The lens unit L3 for focus adjustment is held by a holding ring 4, which in turn is fitted to the inner peripheral surface of the rear unit lens holding cylinder 1 so as to be movable back and forth in the direction of the optical axis.

A manual focus ring 3 is an annular member for adjusting the position of the lens unit 3 for focus adjustment in the direction of the optical axis by an extraneous operation. The manual focus ring 3 is installed on the outer periphery of the central portion of the rear unit lens holding cylinder 1 for rotation about the optical axis.

A lead ring 6 is a cylindrical member formed with a cam groove for prescribing the position of the lens unit L3 for focus adjustment, and is fitted to the outer peripheral surface of the rear unit lens holding cylinder 1 for rotation about the optical axis.

A clutch member 7 is installed on the outer peripheral surface of the lead ring 6 and is movable back and forth in the direction of the optical axis by an extraneous operation.

The clutch member 7, when positioned forwardly on the optical axis, connects a pin 7a to the connecting portion 3a of the manual focus ring 3. Thereby, the rotational movement of the manual focus ring 3 is transmitted to the lead ring 6 through the clutch member 7, and further from the lead ring 6 to the holding ring 4, whereby the lens unit L3 for focus adjustment is driven in the direction of the optical axis.

Also, the clutch member 7, when positioned rearwardly on the optical axis, connect D a pin 7b to a gear member 8. The gear member 8 is a power transmitting mechanism for transmitting a drive force from a power source for automatic focusing installed on the camera body side. Accordingly, by the pin 7b being connected to the gear member 8, the present lens barrel becomes capable of performing an automatic focusing operation.

A front unit lens holding cylinder 9 is a cylindrical member holding the fixed lens unit L1 on the inner peripheral surface thereof. The fixed lens unit L1 is a lens unit positioned most forwardly on the optical axis in the present lens barrel and immovable in the direction of the optical axis.

The front unit lens holding cylinder 9 is mounted on the rear unit lens holding cylinder 1 in such a manner that its rear portion is superposed on the outer periphery of the front end portion of the rear unit lens holding cylinder 1. The front unit lens holding cylinder 9 has its projected portion 9a which is provided on the inner peripheral surface of the rear portion thereof relatively movably fitted in a groove portion 1b provided on the outer peripheral surface of the fore end portion of the rear unit lens holding cylinder 1. The groove portion 1b is a rectilinear groove parallel to the optical axis, and limits the direction of movement of the front unit lens holding cylinder 9 through the projected portion 9a so that the front unit lens holding cylinder 9 may rectilinearly move in the direction of the optical axis relative to the rear unit lens holding cylinder 1.

Switch members 12 and 13 are installed on the fore end surface of the groove portion 1b and the fore end surface of the projected portion 9a, respectively. The switch members 12 and 13 become conductive in a state in which the front unit lens holding cylinder 9 has been moved most forwardly on the optical axis relative to the rear unit lens holding cylinder 1. When the switch member 12 and 13 become conductive, their signals pass through a circuit, not shown, and are transmitted to the camera body side. In the present embodiment, the switch members 12 and 13 correspond to the detecting member of the present invention.

In the present embodiment, the front unit lens holding cylinder 9 is designed to hold only the fixed lenses and therefore, the front unit lens holding cylinder 9 is not provided with a driving mechanism for driving the lens units. Accordingly, in the present lens barrel, it is possible to make a connecting mechanism for the front unit lens holding cylinder 9 and the rear unit lens holding cylinder 1 into a very simple and inexpensive structure.

A clamp 11 is a fixing member for fixing the front unit lens holding cylinder 9 to the rear unit lens holding cylinder 1 so as to prevent the movement of the former in the direction of the optical axis, and is installed so that the main axis of the clamp 11 may coincide with a radial direction centering around the optical axis. The clamp 11 has its tip end portion inserted into one of aperture portions 1c and 1d provided on the outer peripheral surface of the front portion of the rear unit lens holding cylinder 1 at different locations in the direction of the optical axis, thereby fixing the front unit lens holding cylinder 9 to the rear unit lens holding cylinder 1. In the present embodiment, the clamp 11 corresponds to the fixing member of the present invention.

A tripod seat 10 is a member for mounting a tripod thereon, and is installed on the outer peripheral surface of the central portion of the front unit lens holding cylinder 9 for rotation about the optical axis.

FIG. 1 shows a case where the present lens barrel is in a normal photographing state. During this normal photographing, the front unit lens holding cylinder 9 is moved maximally forwardly on the optical axis from the rear unit lens holding cylinder 1, and the clamp 11 has its tip end portion inserted in the aperture portion 1c to thereby fix the front unit lens holding cylinder 9 to the rear unit lens holding cylinder 1. At this time, the projected portion 9a is positioned most forwardly in the groove portion 1b and the switch members 12 and 13 become conductive. The fact that the switch members 12 and 13 are in their conductive state means that their signals are transmitted to the camera body through the aforementioned circuit, not shown. Thereby, the camera body side becomes capable of detecting that the lens units of the lens barrel are disposed in a state in which photographing is possible.

FIG. 2 shows a case where the present lens barrel is in its collapsed state. In the present lens barrel, when the form thereof is to be changed from the normal photographing state to the collapsed state, the clamp 11 is brought out of the aperture portion 1c and the front unit lens holding cylinder 9 is moved rearwardly on the optical axis along the groove portion 1b. Subsequently, when the projected portion 9a has arrived at the rearmost portion of the optical axis, the clamp 11 is inserted into the aperture portion 1d, whereby the front unit lens holding cylinder 9 is again fixed to the rear unit lens holding cylinder 1.

In the present lens barrel, by the above-described collapsing operation being performed, the space between the fixed lens unit L1 and the fixed lens unit L2 is reduced and the full length in the direction of the optical axis is shortened. At the same time, the rear end portion of the front unit lens holding cylinder 9 comes to cover the front end portion of the manual focus ring 3. Accordingly, it becomes apparent that the present lens barrel is in the collapsed state in its appearance, and when an attempt is made to manually operate the manual focus ring 3, the rear end portion of the front unit lens holding cylinder 9 makes that operation difficult to perform. As a result, a user can easily perceive that the present lens barrel is not in a normal state of use, and it is possible to prevent photographing from being forced in spite of the lens barrel being not in a normal photographing state.

Also, in the collapsed state, the projected portion 9a is positioned most rearwardly in the groove portion 1b and therefore, the switch members 12 and 13 become nonconductive. Consequently, the camera body side detects that the present lens barrel is in its collapsed state, and it is possible to avoid an electrical photographing operation such as an automatic focusing operation or a shutter operation being executed in an abnormal state of use.

As described above, in the present embodiment, in a construction wherein the fixed lens unit L1 is disposed in the front unit lens holding cylinder 9 and the other lens units are disposed in the rear unit lens holding cylinder 1, the front unit lens holding cylinder 9 is moved rearwardly on the optical axis in such a manner that a portion thereof is superposed on the rear unit lens holding cylinder 1, whereby the collapsing operation of the lens barrel is performed. Accordingly, in the present embodiment, it is not necessary at all to perform an operation corresponding to the collapsing operation of the lens barrel on the camera body side on which the lens barrel is mounted. Also, in the case of the present embodiment, the present invention is applied to a super-telephoto lens barrel in which the distance between the fixed lens unit L1 and the fixed lens unit L2 is long and therefore, the shortening of the lens barrel by collapsing is done effectively.

Further, in the present embodiment, provision is made of a detecting member for detecting whether the front unit lens holding cylinder is in a position wherein photographing is possible and therefore, when the lens barrel is in its collapsed state and a wrong photographing operation has been performed, it is possible to stop an electrical photographing operation and prevent inappropriate photographing.

Furthermore, the front unit lens holding cylinder 9 covers at least a portion of the manual focus ring 3 when the lens barrel is in its collapsed state and therefore, even when the lens barrel is mounted on a camera body performing a mechanical photographing operation, it is possible to prevent inappropriate photographing, from a change in the external appearance of the lens barrel or the difficulty of the operation of the manual focus ring 3.

(Second Embodiment)

Figure 3:
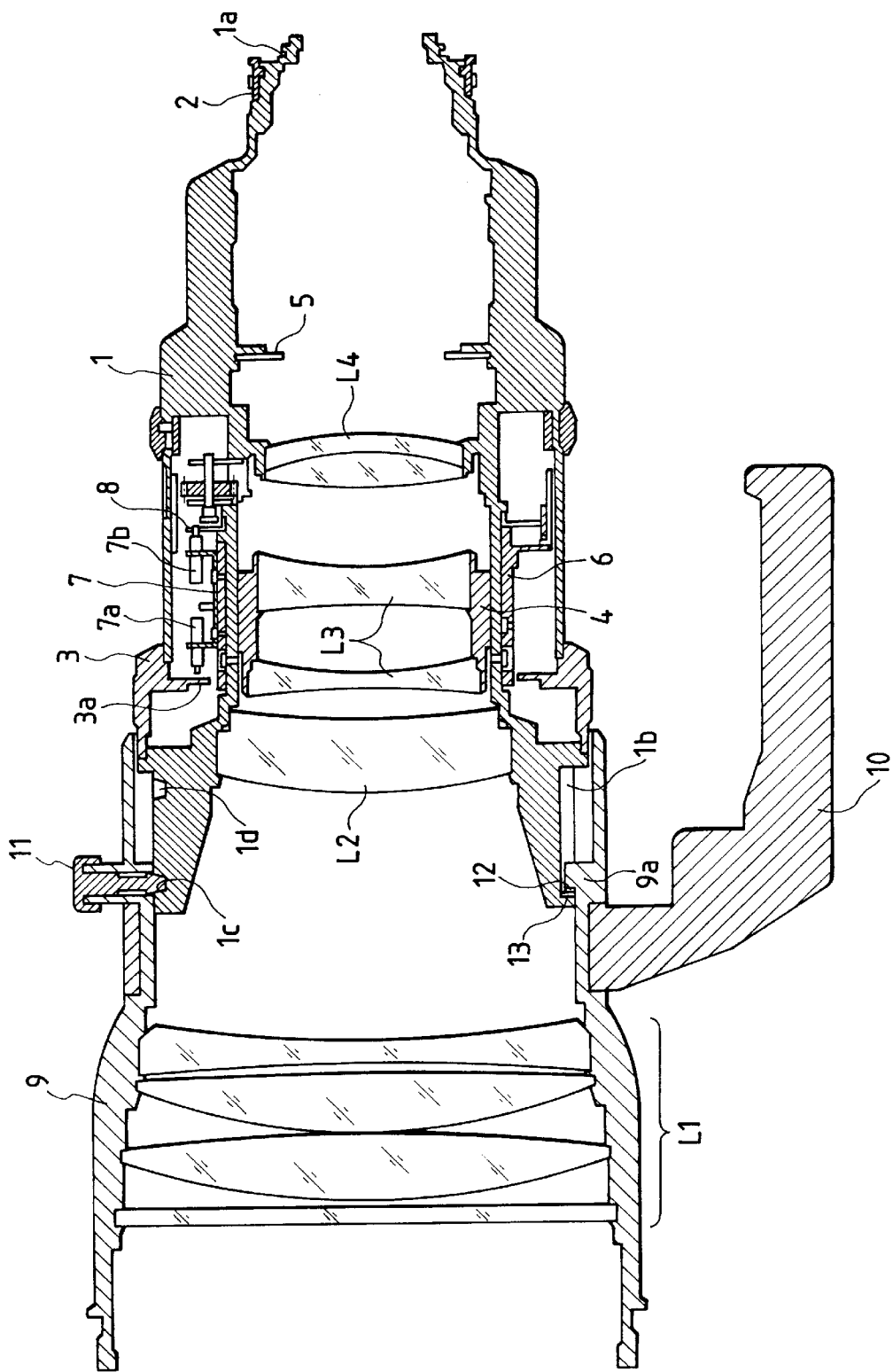
FIG. 3 shows a cross-section when a lens barrel which is a second embodiment of the present invention is in a photographing state.
Figure 4:
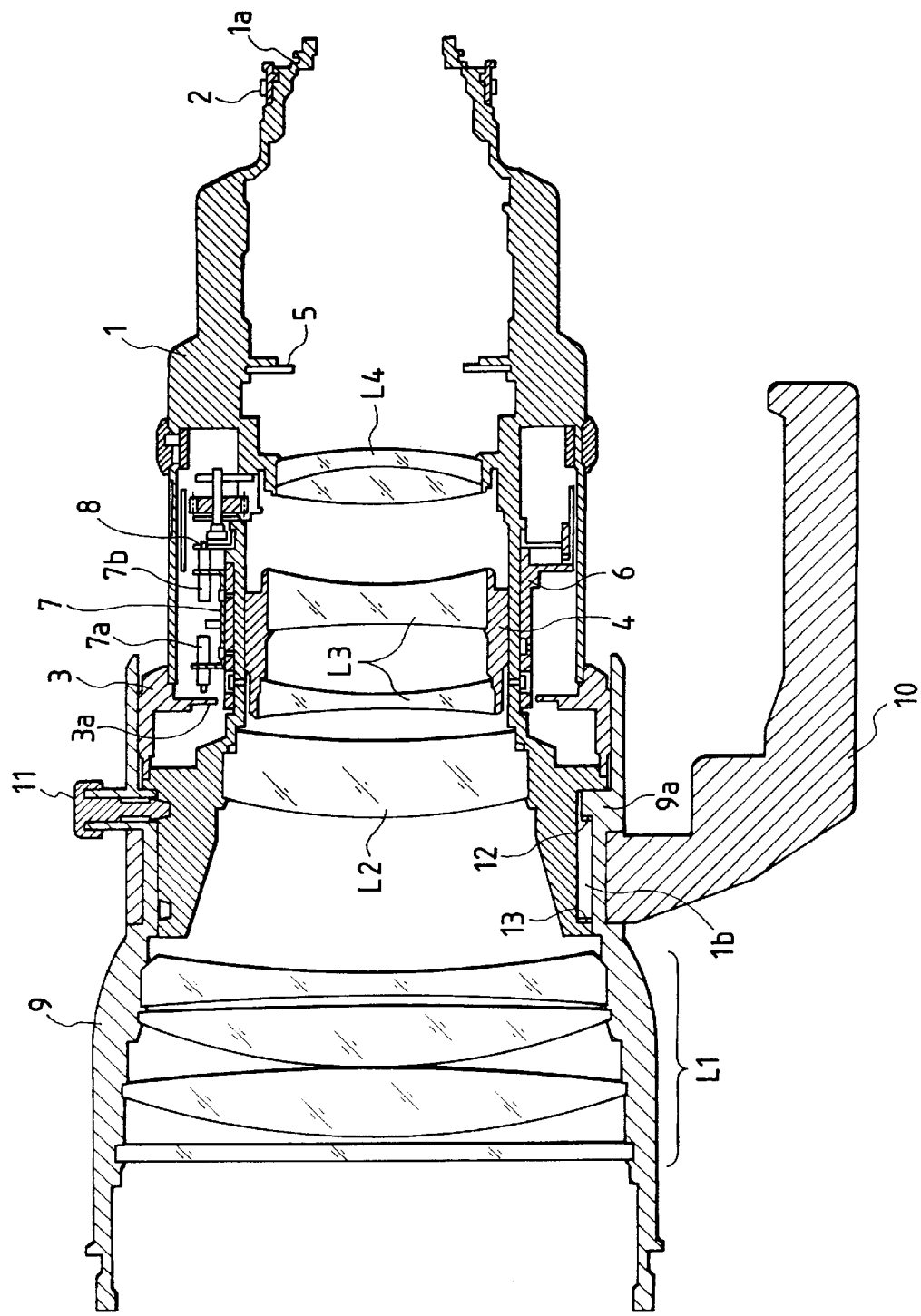
FIG. 4 shows a cross-section when the lens barrel which is the second embodiment of the present invention is in a collapsed state.

FIGS. 3 and 4 show a cross-section of a lens barrel which is a second embodiment of the present invention.

The second embodiment differs from the first embodiment in that the length of the manual focus ring 3 in the direction of the optical axis is made short. Accordingly, as shown in FIG. 4, the manual focus ring 3 in entirely covered with the rear end portion of the front unit lens holding cylinder 9 when the lens barrel is in its collapsed state, and an extraneous rotating operation, i.e., a manual focusing operation, becomes completely impossible. Consequently, in the present lens barrel, it is possible to completely prevent photographing by a manual operation from being effected by mistake when the lens barrel is not in a normal state of use.

(Other Embodiment)

The present invention is not restricted to the above-described embodiments. The above-described embodiments are illustrative, and any form which has substantially the same construction as the technical idea of the present invention described in the appended claims and achieves a similar operational effect is covered by the scope of the present invention.

In the above-described embodiments, the clamp 11 is used to fix the front unit lens holding cylinder 9 to the rear unit lens holding cylinder 1, but use may be made of any other means which can fix the front unit lens holding cylinder 9 to the rear unit lens holding cylinder 1 accurately and reliably in the direction of the optical axis. For example, circumferentially extending groove portions may be added to the front end portion and rear end portion of the groove portion 1b and the projected portion 9a may be fitted to those groove portions to thereby fix the front unit lens holding cylinder 9 in a normal photographing state or in a collapsed state.

What is claimed is:

1. A lens barrel of a shortened full length comprising:
   a photo-taking optical system having a rear unit lens and a front unit lens;
   a rear unit lens holding cylinder to hold said rear unit lens;
   a front unit lens holding cylinder to hold said front unit lens and being movable in the direction of an optical axis relative to said rear unit lens between a photographing position to make said photo-taking optical system capable of photographing with said rear unit lens and a full length shortening position to shorten the full length of the lens barrel in the direction of the optical axis; and
   a fixing member to fix said front unit lens holding cylinder in one of said positions relative to said rear unit lens holding cylinder,
   wherein said fixing member fixes said front unit lens holding cylinder to said rear unit lens holding cylinder, and
   a fixed cylinder is extended and shortened in order to change a length thereof, and said fixed cylinder completely fixes the front lens unit and the rear lens unit at opposite ends thereof.

2. A lens barrel of a shortened full length according to claim 1, wherein said front unit lens is fixed relative to said front unit lens holding cylinder.

3. A lens barrel of a shortened full length according to claim 1, further comprising a detecting member for detecting whether said front unit lens holding cylinder is in a fixed position wherein photographing is possible, and transmitting the detected information to a camera body.

4. A lens barrel of a shortened full length comprising:

a photo-taking optical system having a rear unit lens and a front unit lens;

a rear unit lens holding cylinder to hold said rear unit lens;

a front unit lens holding cylinder to hold said front unit lens and being movable in the direction of an optical axis relative to said rear unit lens between a photographing position to make said photo-taking optical system capable of photographing with said rear unit lens and a full length shortening position to shorten the full length of the lens barrel in the direction of the optical axis;

a fixing member to fix said front unit lens holding cylinder in one of said positions relative to said rear unit lens holding cylinder; and a manually operated member to adjust the in-focus state of said optical system by an extraneous manual operation, and wherein said front lens holding cylinder covers at least a portion of said manually operated member when said front unit lens holding cylinder is in the full length shortening position.

5. A lens barrel of a shortened full length according to claim 4, wherein said rear unit lens includes a movable lens for focus adjustment, and said manually operated member is provided in said rear unit lens holding cylinder so as to drive said movable lens.

6. A lens barrel of a shortened full length according to claim 5, further comprising a manually operated clutch connected to the movable lens, said clutch capable of selectively assuming a power transmitting position for automatic focusing in which it receives a drive force from a camera body side and drives said movable lens and a manually operated position in which it is connected to said manually operated member and transmits the manually operating force from said manually operated member to said movable lens.

7. A lens barrel comprising:

a photo-taking optical system including a front unit lens;

a front unit lens holding cylinder to hold said front unit lens in one of two positions being a fully extended position and a collapsed position to shorten the full length of the lens barrel in the direction of the optical axis; and a fixing member to fix said front unit lens holding cylinder in one of said two positions, wherein said front unit lens holding cylinder and said rear unit lens holding cylinder form a fixed cylinder having a changeable length; and said fixing member is a clamp passing through said front unit lens holding cylinder.

8. A lens barrel according to claim 7, further comprising a rear unit lens, with said front unit lens being movable with respect to said rear unit lens between said two positions.

9. A lens barrel according to claim 8, further comprising a rear unit lens holding cylinder which remains fixed relative to a camera body.

* * * * *